UNITED STATES PATENT OFFICE.

WM. H. SHERWOOD, OF GREENWICH, CONNECTICUT.

IMPROVED COMPOSITION FOR ARTIFICIAL STONE.

Specification forming part of Letters Patent No. 27,480, dated March 13, 1860.

*To all whom it may concern:*

Be it known that I, WILLIAM H. SHERWOOD, of Greenwich, in the county of Fairfield and State of Connecticut, have invented a new and Improved Composition for Artificial Marble; and I do hereby declare that the following is a full, clear, and exact description of the same.

The object of my invention is to produce a cheap and faithful imitation of marble; and it consists in a composition of Keen's cement with alum, silicate of potash, and soda, or soluble glass, rosin dissolved in alcohol, and water. The proportion in which I mix these ingredients is about as follows: alum, two ounces; soluble glass, one pint; solution of rosin, four ounces; water, four gallons. When these ingredients have been well mixed I use of the mixture thus obtained three gills (three-fourths pint) added to one pound of Keen's cement. The cement known as "Keen's cement" is an article imported from England, the method of manufacturing which is a secret; but it seems to consist chiefly of silicates of aluminium.

By mixing the ingredients together in about the proportion above stated a mortar or paste is formed which can be molded to any desired shape, when it is left to dry, and its surface will assume the same polish as genuine marble, so that it is difficult even for those perfectly well acquainted with the nature of marble to distinguish the same from my composition.

By mixing the composition before it is molded and dried with suitable colors I can imitate the various colors of the different sorts of marble, so that I can fill orders for uncolored as well as for variegated marbles with equal facility.

The chemical properties of my imitation marble are such that the same will stand the influence of the weather and of the atmosphere as well as genuine marble; and in many respects it is superior even to that, for it will not be stained by water, oil, or any of the common acids, whereas genuine marble becomes stained by the influence of water or oil, and nearly all acids have an injurious effect on the same. For these reasons it can be used for outdoor-work—such as fronts of buildings, walls, &c.—equally as well as for table-tops, billiard-table beds, sink-fixtures, &c.

When used for fronts of buildings or walls the composition is put on in a plastic state, colored according to orders, and left to dry, when it is rubbed down with sandstone and polished in the same manner as natural marble.

Table-tops, billiard-table beds, &c., are formed by spreading the composition, colored as desired, in a suitable mold, where it is left to harden and dry, when it is taken out and polished in the usual manner.

What I claim as new, and desire to secure by Letters Patent, is—

The within-described composition of Keen's cement, alum, soluble glass, rosin, and water, mixed together in about the proportions stated, and for the purposes specified.

WILLIAM H. SHERWOOD.

Witnesses:
    AUGUSTUS LYON,
    SAMUEL CLOSE.